(12) United States Patent
Du et al.

(10) Patent No.: US 9,733,747 B2
(45) Date of Patent: Aug. 15, 2017

(54) METHOD FOR MEASURING TOUCHING POSITION, TOUCHING ENERGY AND DISPLAY DEVICE THEREOF

(71) Applicant: Chaoliang Du, Nanjing, Jiangsu (CN)

(72) Inventors: Chaoliang Du, Jiangsu (CN); Zhirui Ye, Jiangsu (CN); Lili Jiang, Jiangsu (CN); Xinlin Qing, Jiangsu (CN)

(73) Assignee: Chaoliang Du, Nanjing (CN)

( * ) Notice: Subject to any disclaimer, the term of this patent is extended or adjusted under 35 U.S.C. 154(b) by 180 days.

(21) Appl. No.: 14/650,106

(22) PCT Filed: Dec. 10, 2013

(86) PCT No.: PCT/CN2013/088951
§ 371 (c)(1),
(2) Date: Jun. 5, 2015

(87) PCT Pub. No.: WO2014/094559
PCT Pub. Date: Jun. 26, 2014

(65) Prior Publication Data
US 2015/0317027 A1 Nov. 5, 2015

(30) Foreign Application Priority Data
Dec. 20, 2012 (CN) .......................... 2012 1 0560733

(51) Int. Cl.
*G06F 3/041* (2006.01)
*G06F 3/048* (2013.01)

(52) U.S. Cl.
CPC ............ *G06F 3/0414* (2013.01); *G06F 3/048* (2013.01); *G06F 3/0412* (2013.01); *G06F 3/0416* (2013.01); *G06F 2203/04101* (2013.01); *G06F 2203/04104* (2013.01); *G06F 2203/04105* (2013.01)

(58) Field of Classification Search
None
See application file for complete search history.

(56) References Cited

FOREIGN PATENT DOCUMENTS

| CN | 101901074 | 12/2010 |
| CN | 102804112 | 11/2012 |
| CN | 103076914 | 5/2013 |

OTHER PUBLICATIONS

International Search Report filed in PCT/CN2013/088951 mailed Mar. 20, 2014.

*Primary Examiner* — Nicholas Lee
*Assistant Examiner* — Duane N Taylor, Jr.
(74) *Attorney, Agent, or Firm* — Rankin, Hill & Clark LLP (57) ABSTRACT

The present invention is a method for measuring touching position, touching energy and display device thereof. While touching position is measured, at least two sensors are installed in dispersing form under the sensing panel of touch control equipment. The sensing panel is divided into a plurality of grids. The unit energy distribution vector of the touching signal is compared with the unit energy distribution vector of the benchmark signal of each grid, therefore touching position is obtained. While touching energy is measured, at least one sensor is installed under the sensing panel. The sensing panel is divided into a plurality of grids. Touching position would be obtained by the above method for measuring touching position or other methods. The touching energy could be calculated by comparing the detected touching signal energy with energy of benchmark signal at touching position in corresponding grid. The present invention could reduce the cost, complexity and power consumption of touch control equipment dramatically.

10 Claims, 5 Drawing Sheets

METHOD FOR MEASURING TOUCHING POSITION, TOUCHING ENERGY AND DISPLAY DEVICE THEREOF

TECHNICAL FIELD

The present invention relates to input and output device of electronic equipment, and more particularly, relating to method for measuring touching position, energy and display device.

BACKGROUND

Touch control equipment has become the preferred configuration of present man-machine interaction electronic products due to its features of simple and convenient operation, and can be found everywhere from industry to family, and from office to entertainment. For touch control equipment, people raise more expectations and requirements simultaneously when pursuing accuracy, stabilization and convenience, such as reducing price, reducing the energy consumption, further enhancing the sensitivity of touching energy and force, and etc.

Nowadays, there are many kinds of technique for measuring touching, including: resistive, capacitive, infrared-ray type, SAW type, electro-magnetic type, optical or near field imaging type and etc. These techniques for measuring touching are very sensitive to touching position, but they all have two drawbacks in common: 1. failing to detect the touching energy or force; 2. when touching sensing area increases, the cost of touching sensing system rises up dramatically. For the problem of failing to detect touching force, at present, many techniques use a sensor group distributed under the touch screen to solve this problem. But this manner has several big defects as follows: 1. the sensor can only detect nearby force thereof, therefore, more sensors are needed to form a sensor group to cover the entire touch screen, which will increase the weight, complexity and power consumption of the equipment; 2. the sensors and the fingers are also separated by several layers of glass; the touching energy of the fingers is dispersed and attenuated by layers of glass before detected by the sensors, therefore, the precision is not good, For high-cost problem, there is no fine solution at present.

SUMMARY

With respect to the foregoing problems, the present invention provides a method for measuring touching position. At least two sensors are located below sensing panel of touch control equipment in dispersing form. The sensing panel is divided into a plurality of grids. All the grids would be touched with given benchmark energy one by one. Then the unit energy distribution vectors of benchmark signal of each grid are obtained. When one-time touching is sensed, the unit energy distribution vector of corresponding touching signal is calculated, according to signal energy sensed by the sensor. The unit energy distribution vector of the touching signal and the unit energy distribution vector of the benchmark signal of each grid are compared in turn, thereby the sequence number of the grid is confirmed, and the touching position is obtained.

The present invention also provides a method for measuring touching energy. A sensor is installed under the sensing panel of touch control equipment. The sensing panel is divided into a plurality of grids. All the grids are touched by using given energy of benchmark signal, then the energy of the benchmark signal of each grid from said sensor will be obtained. When the sensing panel is touched for one time, according to signal energy detected by sensor, touching position would be calculated by the above method or other methods, such as capacitive method, infrared ray method, SAW method and etc. At last, the detected energy of benchmark signal at touching position is compared with energy of one-time touching signal, to calculate the touching energy.

The present invention also provides a display device, including: display component; sensing panel located above said display component; at least two sensors in dispersing form installed on lower surface of said sensing panel; dividing said sensing panel into a plurality of grids, using given benchmark energy to touch all the grids one by one, obtaining unit energy distribution vector of the benchmark signal of each grid; when one-time touching is sensed, calculating the unit energy distribution vector of corresponding touching signal, according to signal energy sensed by the sensor; comparing the unit energy distribution vector of the touching signal with the unit energy distribution vector of the benchmark signal of each grid in turn, thereby confirming the sequence number of the grid where touching is located, furthermore, touching position is also obtained.

The present invention also provides a display device, including: display component; sensing panel located above said display component; a sensor installed on lower surface of said sensing panel; dividing said sensing panel into a plurality of grids, using given benchmark energy to touch all the grids one by one, obtaining energy of the benchmark signal of each grid which is detected by said sensor; when one-time touching is sensed, firstly, according to signal energy sensed by the sensor, the touching position is obtained by above or other methods for measuring touching position, such as capacitive method, infrared ray method, SAW method and etc. Finally, the detected energy of benchmark signal at touching position is compared with energy of one-time touching signal, to calculate the touching energy.

The method for measuring touching position, energy and display device in present invention has the following advantages: 1. the present invention compares the unit energy distribution vector of the touching signal with the unit energy distribution vector of the benchmark signal, to obtain touching position, by at least two sensors receiving impact wave propagating from touching position, which are located below sensing panel. Therefore the present invention could reduce the cost and complexity of touch control equipment dramatically; 2. The method for measuring touching energy in present invention, change conventional way for measuring touching energy which utilizes sensor array. The present invention could reduce the amount of sensors drastically. Furthermore, the cost, complexity and power consumption of touch control equipment could be cut down.

DETAILED DESCRIPTION

The present invention provide a method for measuring touching position, comprising: installing at least two sensors in a dispersing form under the sensing panel of touch control equipment, dividing the sensing panel into a plurality of grids, using given benchmark energy to touch all the grids one by one, and obtaining the unit energy distribution vector of a benchmark signal of each grid, when one-time touching is sensed, calculating the unit energy distribution vector of corresponding touching signal, according to signal energy sensed by the sensor, comparing the unit energy distribution vector of the touching signal with the unit energy distribution vector of the benchmark signal of each grid in turn, thereby confirming the sequence number of the grid where touching is located.

Taking the touch control equipment having a touch screen for example, the method for measuring touching position in present invention will be described in details hereinafter with reference to the drawings.

Figure 1:
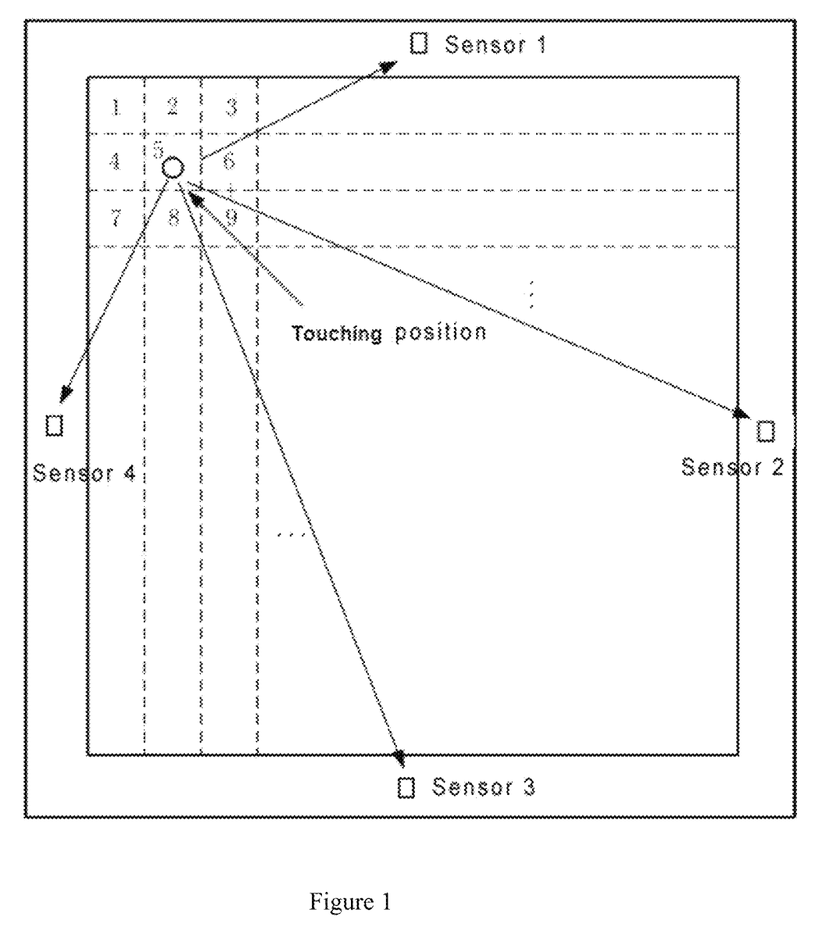
FIG. 1 is a diagram of method for measuring touching position according to an embodiment of the present invention.

As shown in FIG. 1, four sensors are arranged in a dispersing form under the touch screen of the touch control equipment, and the number of the sensor is marked by m, wherein m is equal to 1, 2, 3 . . . . When fingers or other articles touches a point of the touch screen, impact waves will be generated at the touching position. The impact waves will spread to all directions along the touch screen, and the four sensors under the touch screen therewith detect corresponding impact wave signals. For the touching that will not cause permanent deformation or damage to the touch screen, it may be deemed as low speed impact. The low speed impact only causes elastic deformation to the touch screen. When the distance between the touching position and the sensor keeps unchanged, the touching energy is in direct proportion to the impact wave signal energy detected by the sensor.

The detailed implementation steps are as follows:

1) The touching sensing area (as shown in FIG. 1, an internal rectangle area of the touch screen) of the sensing panel is divided into a plurality of grids according to the requirements on the application precision and a proper length (for instance, 5 mm), and marked with n, wherein n is equal to 1, 2, 3 . . . (grid 1 to grid 9 as shown in FIG. 1, wherein the number is not limited to this).

2) Given benchmark energy $E_0$ is used for gradually touching all the grids divided in step 1), and the signal energy $(E_{1n}^0, E_{2n}^0, E_{3n}^0, \ldots, E_{mn}^0)$ detected by each sensor when touching every grid is recorded, and served as a respective benchmark energy distribution vector of each grid.

3) The unit energy distribution vector $\overline{e_n^0}$ of the benchmark signal of each grid is calculated based on the respective benchmark energy distribution vector $(E_{1n}^0, E_{2n}^0, E_{3n}^0, \ldots, E_{mn}^0)$ of each grid in step 2):

$$\overline{e_n^0} = \left(1, \frac{E_{2n}^0}{E_{1n}^0}, \frac{E_{3n}^0}{E_{1n}^0}, \ldots, \frac{E_{mn}^0}{E_{1n}^0}\right).$$

Wherein, during calculating unit energy distribution vector, it is feasible to use signal energy which is detected by any sensor, as the denominator in above equation.

4) supposing the touching is located in an unknown grid Y, when one-time touching is sensed, calculating the unit energy distribution vector $\overline{e}_Y$ of corresponding touching signal, according to signal energy $(E_{1Y}, E_{2Y}, E_{3Y}, \ldots, E_{mY})$ detected by each sensor:

$$\overline{e}_Y = \left(1, \frac{E_{2Y}}{E_{1Y}}, \frac{E_{3Y}}{E_{1Y}}, \ldots, \frac{E_{mY}}{E_{1Y}}\right).$$

Please note that, the signal energy as the denominator in above equation and the signal energy which is the denominator in equation of step 3), should be detected by the same sensor.

5) comparing the unit energy distribution vector $\overline{e}_Y$ of the touching signal in step 5) with the unit energy distribution vectors $\overline{e_n^0}$ of the benchmark signals of all the grids in step 4) by comparing algorithm.

when $\overline{e}_Y$ is closest to the unit energy distribution vector of the benchmark signal of a certain grid X, then the touching position is located in grid X, i.e. Y equals to X.

In this embodiment, said comparing algorithm is one of correlation coefficient method, standard deviation method, covariance method, included angle cosine method, Minkowsky distance method, Camberra distance method, maximum dissimilarity coefficient method, relative error distance method.

By the above method, touching position could be detected, what's more, in the present invention, touching position is detected by at least two sensors located under the sensing panel of touch control equipment. The sensors receive the impact wave from the touching position. By the principle of acoustic wave propagation, the unit energy distribution vector of touching signal and unit energy distribution vector of benchmark signal are compared to find touching position. The present invention will cut the cost of touch control equipment, and reduce complexity of the system.

After achieving the touching position by the above method, it is possible to calculate the touching energy further on. After the touching position located in grid X is obtained, it is feasible to calculate the touching energy by the following equation:

$$E = a \cdot E_0 \cdot \frac{E_{mX}}{E_{mX}^0} + b, m = 1, 2, 3 \ldots$$

wherein, E is the touching energy of current touch, $E_0$ the given benchmark energy, $E_{mX}^0$ is the benchmark signal energy detected by sensor m from grid X when sensing panel is touched with given benchmark energy $E_0$, $E_{mX}$ is the signal energy detected by sensor m when currently grid X is touched, a and b are empirical coefficients.

In this embodiment, when measuring touching position and energy, i.e. during sensing touching, each sensor could calculate the signal energy by the following algorithm:

$$E_{mn} = \int_{T_{mn}}^{T_{mn}^S} S_{mn}^2(t)\,dt,$$

wherein, $E_{mn}$ is the impact wave signal energy recorded by a sensor m when a grid n is touched, $S_{mn}(t)$ is a signal waveform amplitude recorded by the sensor m when the grid n is touched, t represents time, $T_{mn}$ is a time value when the signal waveform amplitude detected by the sensor m is greater than a certain given noise threshold $S_{noi}$; $T^S_{mn}$ is a time value when the signal waveform amplitude detected by the sensor m is less than a certain given attenuation discriminant value $S_{att}$.

In another embodiment, when measuring touching position and energy, i.e. during sensing touching, each sensor could calculate the signal energy by the following algorithm:

$$E_{mn} = \sum_{k=k_1}^{k=k_2} A_{mn}^2(k)$$

wherein $E_{mn}$ is the signal energy detected by sensor m when grid n is touched, $A_{mn}(k)$ is the wave amplitude detected by sensor m in $k^{th}$ sampling, $k_1$ is the beginning of sampling touching wave, and $k_2$ is the ending of sampling touching wave.

Figure 2:
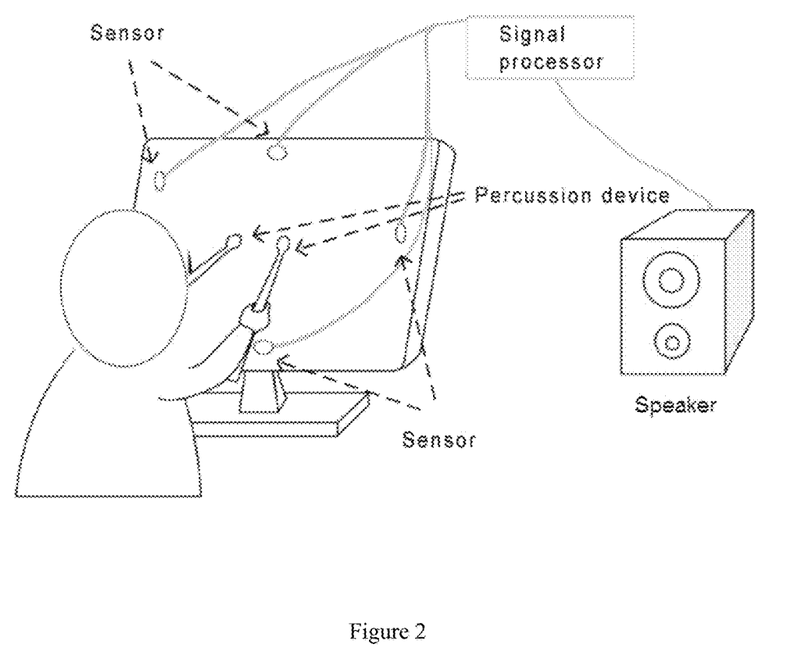
FIG. 2 is a diagram of method for measuring touching position in single electronic musical instrument applied with the present invention.

The above embodiment is only the example of the present invention' application, whereas, the present invention includes more application field, such as:

1) As shown in FIG. 2, a single electronic musical instrument with a sensing panel. Sensors which are used to detect the position and energy of touching or touching, are installed on the sensing panel of percussion device. The sensors are connected to signal processor. Then the speaker generates the same or similar sound as somebody touches the same position of real musical instrument.

Figure 3:
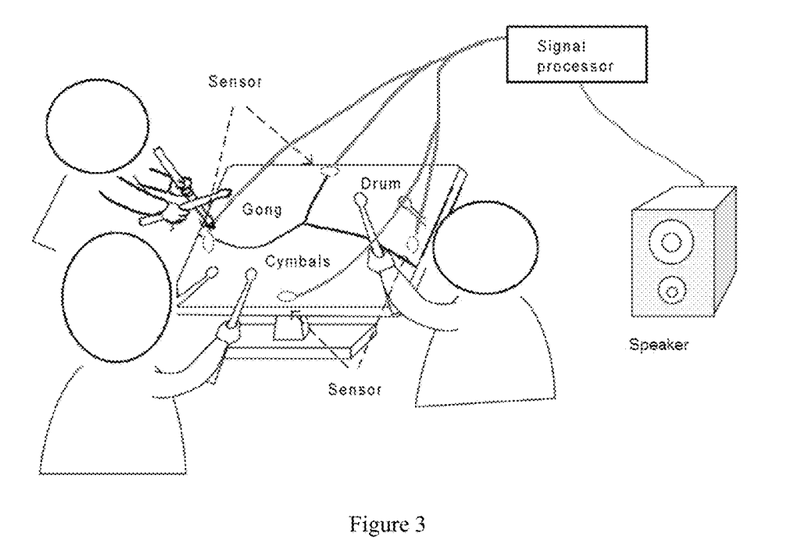
FIG. 3 is a diagram of method for measuring touching position in multiple electronic musical instrument applied with the present invention.

2) As shown in FIG. 3, the multiple electronic musical instrument with a sensing panel. Based on above technique, the sensing panel is divided into many areas to simulate different musical instruments, such as gong, cymbal and drum. The present invention identifies the touching position, then signal processor finds out the characteristics of sound of the musical instrument which this area represents. Further on, this kind of musical instrument would be simulated. The sensing panel of the multiple electronic musical instrument could be operated by one person or a band.

Figure 4:
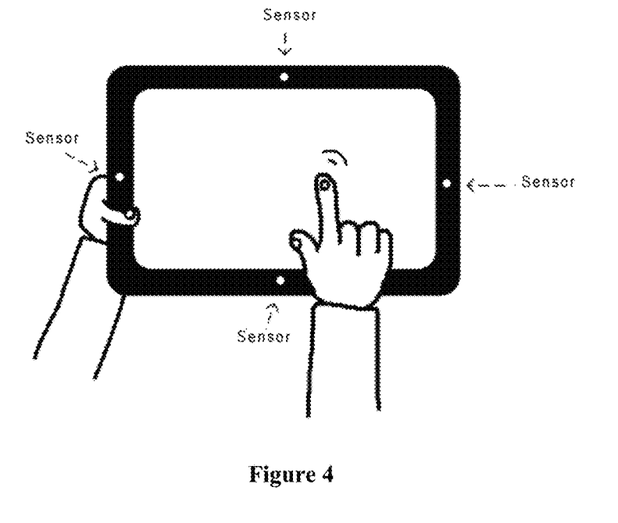
FIG. 4 is a diagram of method for measuring touching position in tablet PC applied with the present invention.

3) As shown in FIG. 4, a game console with a sensing panel, such as tablet PC. It is feasible to control the game by sensing touching position and energy in sensing panel, in present invention. For example, it is possible to control the role in game by touching different areas of sensing panel with different energy.

Figure 5:
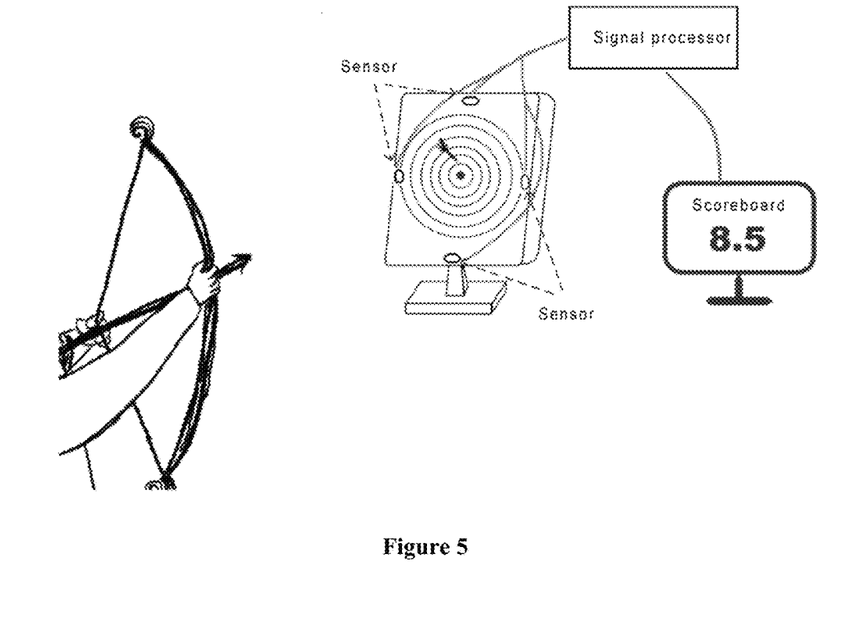
FIG. 5 is a diagram of method for measuring touching position in automatic sensing target applied with the present invention.

4) The present invention can be applied to an automatic sensing target as shown in FIG. 5. Sensors are installed below a shooting target, and the sensors are connected to a signal processor. The signal processor analyzes and calculates a result, transmits the result to a shooting performance scoreboard to display. The present invention can be applied to accurately and quickly detect the position of a shooting point and the force of shooting, so as to realize automatic shooting assessment.

Figure 6:
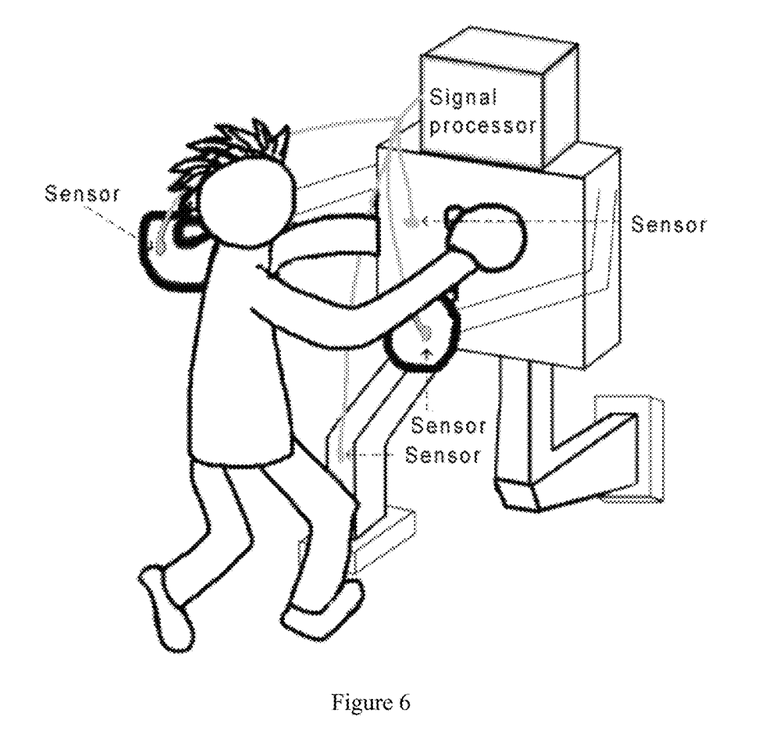
FIG. 6 is a diagram of method for measuring touching position in robot sensing system applied with the present invention.

5) The present invention can be applied to machinery equipment having a percussion sensor as shown in FIG. 6.

For example, a robot sensing system is equipped with sensors. The sensors are connected to a control center of the robot, wherein the signal processor is installed in the control center to calculate and analyze information collected by the sensors. The control center controls power equipment of the robot to make the robot make different actions according to the analysis result of the signal processor, such as percussed position and force.

In this embodiment, said sensing panel could be flat panel, curved panel or other forms of panel.

In this embodiment, said sensing panel is made of metal, glass, plastic, wood, composite material or leather.

In this embodiment, said sensor is piezoelectric sensor, resistance sensor, fiber optic sensor or other sensors for measuring deformation.

Figure 7:
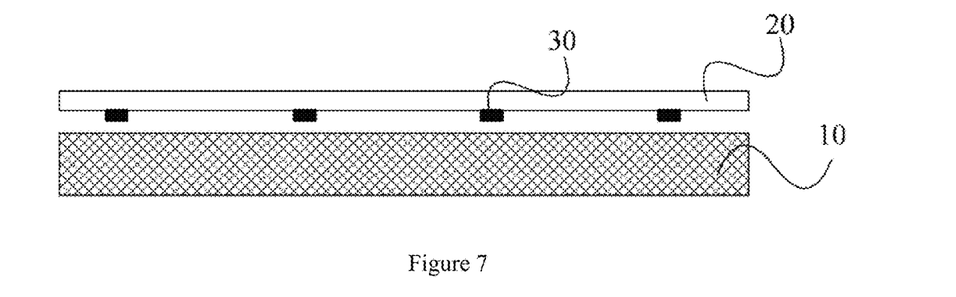
FIG. 7 is a diagram of method for measuring touching position in display device applied with the present invention.

Corresponding to the above embodiments, the present invention provide a display device, which could measure the touching position in the above embodiments. As shown in FIG. 7, it includes: display component 10; sensing panel 20 located above said display component 10; at least two sensors 30 in dispersing form installed under said sensing panel 20;

dividing said sensing panel into a plurality of grids, using given benchmark energy to touch all the grids one by one, obtaining unit energy distribution vector of the benchmark signal of each grid, when one-time touching is sensed, calculating the unit energy distribution vector of corresponding touching signal, according to signal energy sensed by the sensor, comparing the unit energy distribution vector of the touching signal with the unit energy distribution vector of the benchmark signal of each grid in turn, thereby confirming the sequence number of the grid where touching is located.

In this embodiment, said display device is mobile phone, tablet PC, laptop PC, PC display, or LCD TV, all of which have sensing panel.

Figure 8:
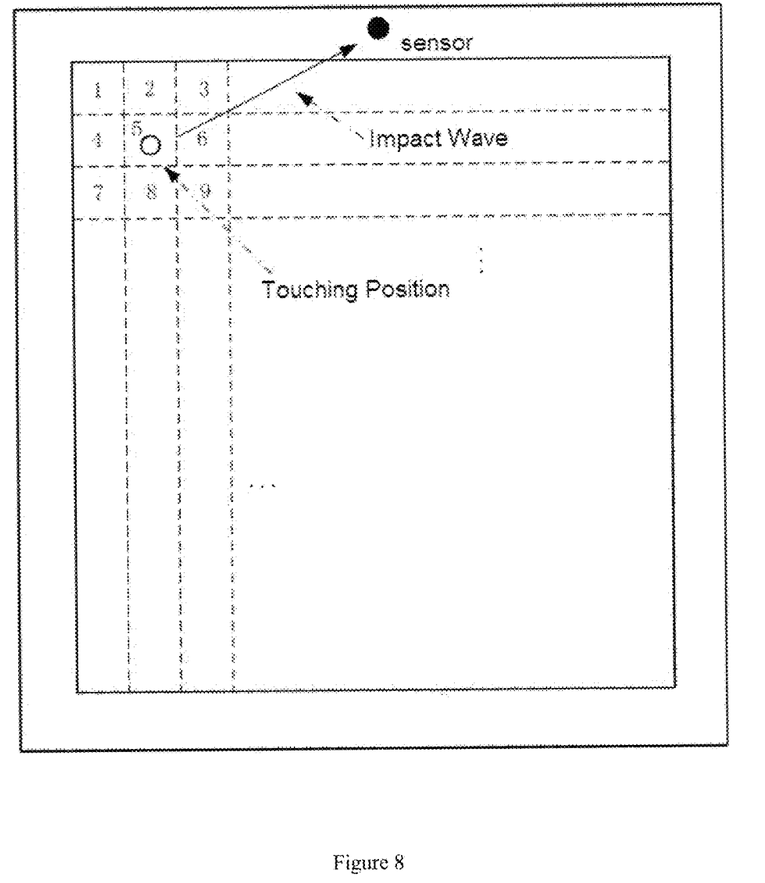
FIG. 8 is a diagram of method for measuring touching energy according to an embodiment of the present invention.

Except for obtaining touching position and energy by the method disclosed in above embodiments, the present invention also provides another method for measuring touching energy, as shown in FIG. 8, including: installing a sensor under the sensing panel of touch control equipment, dividing the sensing panel into a plurality of grids, using given benchmark energy $E_0$ to touch all the grids one by one, when touching each grid obtaining the benchmark signal energy $E_n^0$ which is detected by said sensor;

when touching for one time, obtaining touching position by position sensing system, assuming touching position locates in grid m, and the signal energy detected by sensor is $E_m$;

calculating current touching energy E according to the following formula:

$$E = a \cdot E_0 \cdot \frac{E_c}{E_m^0} + b$$

wherein $E_0$ the given benchmark energy, $E_m^0$, is the benchmark signal energy detected by said sensor from grid m when touching with given benchmark energy $E_0$, $E_c$ is the signal energy detected by sensor when currently touching grid m, a and b are empirical coefficients. In this embodiment, a and b are determined by experiment. Their values depend on different sensing panels. Generally speaking, when a is one, and b is zero, the error of measuring energy is 10% at maximum. If the sensing panel is relatively large (the area of plane is at least 40 inches), then a could be 1.1, and b could be 0.001 (joule), to increase precision of measuring energy.

In this embodiment, when measuring one-time touching, it is possible to obtain touching position by sensing system at any position, by kinds of method for measuring position, such as resistive, capacitive, infrared-ray type, SAW type, electro-magnetic type, optical or near field imaging type.

It is necessary to utilize at least two sensors to detect touching position, if using foregoing embodiment. However, if using resistive, capacitive, infrared-ray type, SAW type, electro-magnetic type, optical or near field imaging type of method for measuring position, it is unnecessary to install extra sensors under the sensing panel of touch control equipment.

Capacitive touch screen works with the principle of induced current of human body. Capacitive touch screen is a kind of compound four-layers glass screen. The inner surface and interlayer are coated by a layer of ITO respectively. Outemost layer is a thin layer of protective silica glass. The interlayer of ITO is working surface, on which four electrodes locate at four corners. The inner surface of ITO is shielding layer to maintain a favorable working environment. When finger touches on metal layer, the electrical field of human body, user and touch screen form a coupling capacitor. For high-frequency current, capacitor is conductive. Therefore, a tiny amount of current flow through the contact point of finger. This current flow out through said four electrodes located at four corners of touch screen. And magnitude of the current is positively proportional to the distance between finger and corners. The controller obtains the touching position by calculating ratio of four currents.

IR-touch screen consists of IR-transmitter and IR-receiver which are all located outer frame of touch screen. Therefore a infrared-ray detection network forms on the surface of screen. Any action of touching will change the infrared-ray on the touching position so as to realize operating IR-touch screen. The principle of IR-touch screen which utilizes IR-transmitter and IR-receiver, is similar to SAW-touch screen. These IR components form a infrared-ray detection network. Any touching object (such as finger) could change the infrared-ray on the touching position. The change of infrared-ray on the touching position will be transformed into signal of touching position so as to realize the response to the touching. Circuit boards are located On four sides of IR-touch screen so that IR matrix is formed accordingly.

In this embodiment, said sensing panel is one of a flat panel and a curved panel.

In this embodiment, said sensing panel is made of metal, glass, plastic, wood, composite material or leather.

Figure 9:
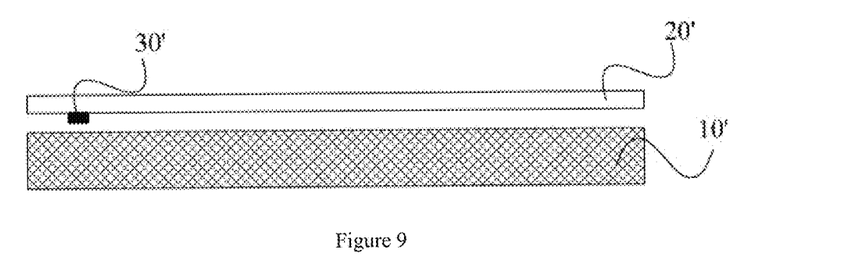
FIG. 9 is a diagram of method for measuring touching energy in display device applied with the present invention.

Corresponding to the above embodiment, the present invention provides a kind of display device. As shown in FIG. 9, the display device comprises: display component 10'; sensing panel 20' located above said display component 10'; a sensor 30' installed under said sensing panel 20'.

The sensing panel is divided into a plurality of grids. All the grids are touched by using given benchmark energy $E_0$. Then unit energy distribution vector $E_n^0$ of the benchmark signal of each grid from said sensor will be obtained;

when one-time touching happens, the touching position is obtained by position sensing system, assuming touching position located in grid m, then the signal energy is detected by sensor is $E_m$;

calculating touching energy E according to the following formula:

$$E = a \cdot E_0 \cdot \frac{E_c}{E_m^0} + b$$

wherein $E_0$ the given benchmark energy, $E_m^0$ is the benchmark signal energy detected by said sensor from grid m when touching with given benchmark energy $E_0$, $E_c$ is the signal energy detected by sensor when currently touching grid m, a and b are empirical coefficients. In this embodiment, the value of a, b are determined by experiment. Their value depend on different sensing panel. Generally speaking, when a is one, and b is zero, the error of measuring energy is 10% at maximum. If the sensing panel is relatively large (the area of plane is at least 40 inches), a could be 1.1, and b could be 0.01, to increase precision of measuring energy.

In this embodiment, said display device is one of mobile phone, tablet PC, laptop PC, PC display, LCD TV and etc, all of which have sensing panel.

Due to above two technical solutions, The present invention has the following advantages: 1. the present invention compares the unit energy distribution vector of the touching signal with the unit energy distribution vector of the benchmark signal, to obtain touching position, by at least two sensors receiving impact wave propagating from touching position, which are located below sensing panel. Therefore the present invention could reduce the cost and complexity of touch control equipment dramatically; 2. The method for measuring touching energy in present invention, change conventional way for measuring touching energy which utilizes sensor array. The present invention could reduce the amount of sensors drastically. Furthermore, the cost, complexity and power consumption of touch control equipment could be cut down. The present invention could be used in many equipment which has sensing panel, such as tablet PC, smart phone, service terminal, game control panel, shooting target, electronic musical instrument and etc.

The invention claimed is:
1. A method for measuring a touching position, comprising:
   1) installing at least two sensors in dispersing form under a sensing panel of touch control equipment, and marking the at least two sensors with sequence number m, wherein m is equal to 1, 2, 3. . . ;
   2) dividing a touching sensing area of the sensing panel into a plurality of grids according to requirements of an application's precision, and marking the grids with n, wherein n is equal to 1, 2, 3. . . ;
   3) using given benchmark energy $E_0$ to touch all the grids divided in step 2) one by one, and recording a signal energy ($E_{1n}^0, E_{2n}^0, E_{3n}^0, \ldots, E_{mn}^0$) detected by each sensor when touching every grid, wherein the signal energy sensed by each sensor when touching every grid is served as the benchmark energy distribution vector of each grid;
   4) Based on the benchmark energy distribution vector of each grid ($E_{1n}^0, E_{2n}^0, E_{3n}^0, \ldots, E_{mn}^0$) in step 3), calculating the unit energy distribution vector $\overline{e_n^0}$ of the benchmark signal of each grid:

$$\overline{e_n^0} = \left(1, \frac{E_{2n}^0}{E_{1n}^0}, \frac{E_{3n}^0}{E_{1n}^0}, \ldots, \frac{E_{mn}^0}{E_{1n}^0}\right);$$

5) supposing the touching is located in an unknown grid Y, when one-time touching is sensed, calculating the unit energy distribution vector $\bar{e}_Y$ of corresponding touching signal, according to signal energy ($E_{1Y}, E_{2Y}, E_{3Y}, \ldots, E_{mY}$) detected by each sensor:

$$\bar{e}_Y = \left(1, \frac{E_{2Y}}{E_{1Y}}, \frac{E_{3Y}}{E_{1Y}}, \ldots, \frac{E_{mY}}{E_{1Y}}\right);$$

6) comparing the unit energy distribution vector $\bar{e}_Y$ of the touching signal in step 5) with the unit energy distribution vectors $\overline{e_n^0}$ of the benchmark signals of all the grids in step 4) by a comparing algorithm, when $\bar{e}_Y$ is closest to the unit energy distribution vector of the benchmark signal of a certain grid X, then the touching position is located in grid X, i.e. Y equals to X.

2. The method for measuring the touching position according to claim 1, comprising: when calculating unit energy distribution vector, the signal energy detected by any sensor is used as denominator, but in step 4) and 5) the signal energy as denominator is detected by the same sensor.

3. The method for measuring the touching position according to claim 1, comprising: after obtaining said touching position located in grid X, calculating the touching energy E using the following formula:

$$E = a \cdot E_0 \cdot \frac{E_{mX}}{E_{mX}^0} + b, m = 1, 2, 3 \ldots$$

wherein, E is the touching energy of current touch, $E_0$ the given benchmark energy, $E_{mX}^0$ is the benchmark signal energy detected by sensor m from grid X when sensing panel is touched with given benchmark energy $E_0$, $E_{mX}$ is the signal energy detected by sensor m when currently grid X is touched, a and b are empirical coefficients.

4. The method for measuring the touching position according to claim 1, comprising:

when sensing the touching, calculate the detected signal energy by the following formula:

$$E_{mn} = \int_{T_{mn}}^{T^S_{mn}} S_{mn}^2(t) dt,$$

wherein, $E_{mn}$ is the signal energy recorded by a sensor m when a grid n is touched, $S_{mn}(t)$ is a signal waveform amplitude recorded by the sensor m when the grid n is touched, Tmn is a time value when the signal waveform amplitude detected by the sensor m is greater than a certain given noise threshold $S_{noi}$; $T^S_{mn}$ is a time value when the signal waveform amplitude detected by the sensor m is less than a certain given attenuation discriminant value $S_{att}$.

5. The method for measuring the touching position according to claim 1, wherein said every sensor calculates the detected signal energy using the following formula, when sensing the touching,:

$$E_{mn} = \sum_{k=k_1}^{k=k_2} A_{mn}^2(k)$$

wherein $E_{mn}$ is the signal energy detected by sensor m when grid n is touched, $A_{mn}(k)$ is the wave amplitude detected by sensor m in $k^{th}$ sampling, $k_1$ is the beginning of sampling touching wave, and $k_2$ is the ending of sampling touching wave.

6. The method for measuring the touching position according to claim 1, wherein said touch control equipment is one of a touch screen, a touch pad, an electronic musical instrument with a sensing panel, a game console with a sensing panel, an automatic sensing target or machinery equipment having a percussion sensor.

7. The method for measuring the touching position according to claim 1, wherein said sensing panel is one of a flat panel and a curved panel.

8. The method for measuring the touching position according to claim 1, wherein said sensing panel is made of metal, glass, plastic, wood, composite material or leather.

9. The method for measuring the touching position according to claim 1, wherein said sensor is one of a piezoelectric sensor, a resistance sensor, and a fiber optic sensor.

10. The method for measuring the touching position according to claim 1, wherein said comparing algorithm is one of correlation coefficient method, standard deviation method, covariance method, included angle cosine method, Minkowsky distance method, Camberra distance method, maximum dissimilarity coefficient method, relative error distance method.

* * * * *